TUNNEL DIODE SWITCH CIRCUITS FOR MEMORIES

Filed Jan. 3, 1961

INVENTOR.
MELVIN M. KAUFMAN
BY
Carl V. Olson
ATTORNEY

United States Patent Office 3,119,985

Patented Jan. 28, 1964

3,119,985

TUNNEL DIODE SWITCH CIRCUITS FOR MEMORIES

Melvin M. Kaufman, Merchantville, N.J., assignor to Radio Corporation of America, a corporation of Delaware Filed Jan. 3, 1961, Ser. No. 80,163
10 Claims. (Cl. 340—173)

This invention relates to tunnel diode switch circuits. The switch circuits of the invention are, for example, for memories used in high speed electronic computers, and especially useful in coincident voltage word selection switches of the type which select a word line in the memory in response to energization of both of the associated X and Y selection lines.

A coincident voltage selected memory is one wherein each word, consisting of a plurality of information bits, is stored in a series of memory elements coupled to a corresponding word line. The word line is energized when it is desired to write information into, or read information out of, the memory elements along the word line. Memories normally have storage locations for a great many words, and selection of a particular word line for writing or reading purposes is accomplished by a matrix of X selection lines and orthogonal Y selection lines. The matrix is arranged so that there is a crossover of an X selection line and a Y selection line for each word line in the memory. A switch circuit is provided at each crossover having inputs coupled to the associated X and Y selection lines and having an output coupled to the associated word line in the memory. When an X selection line and a Y selection line are both energized, the associated switch circuit is operative to energize the associated word line.

Tunnel diodes are useful in electronic computers because of the very high speed at which they can be switched between a low voltage state and a high voltage state However, the high operating speed characteristic of tunnel diodes is coupled with a disadvantage arising from the fact that a tunnel diode has only two terminals which must be used as both input and output terminals. Therefore, a tunnel diode does not inherently provide a desired isolation between its input and output circuits. This property of tunnel diodes complicates their use as X—Y word line selection switches because each X selection line is permanently connected to the X inputs of a large number of X—Y selection switches, and each Y selection line is similarly permanently connected to the Y inputs of a large number of X—Y selection switches. When one X selection line and one Y selection line are energized, all of the selection switches connected to the lines, (and the output circuits connected to the selection switches, through common terminals) tend to draw some current from the X and Y selection lines so that, in total, large loads are presented to the X and Y signal sources. It is desired that, when one X selection line and one Y selection line are energized, current be drawn from the lines by only the one selection switch located at the crossover of the X and Y lines.

It is therefore a general object of this invention to provide a tunnel diode X—Y word selection switch capable of high speed operation and characterized in not presenting any appreciable load to the X and Y selection lines unless both the X and Y selection lines are simultaneously energized.

It is another object of this invention to provide an improved tunnel diode word selection switch circuit capable of high speed operation in responding solely to simultaneous energization from both an X and a Y selection line, and yet providing isolation between the X and Y selection lines when only one of them is energized.

It is a further object to provide an improved system for the X—Y selection of word lines in a high speed memory.

In one aspect, the invention comprises a word switch circuit for use in a word organized memory system having a word line for each word storage position in the memory, and having a matrix of X selection lines and Y selection lines wherein each crossover of one X selection line and one Y selection line corresponds with one of the word lines in the memory. Each word selection switch includes an impedance and a tunnel diode connected between a direct current bias terminal and the Y selection line. An input tunnel rectifier is connected between the X selection line and the tunnel diode. An output tunnel rectifier is connected from the tunnel diode to an output terminal. A tunnel diode amplifier may be connected from the output terminal to the associated word line which is in turn connected to the memory elements associated with the word line in the memory array. The tunnel diode and input tunnel rectifier are poled and biased so that the tunnel diode is normally in one of its voltage states and so that an input pulse on only one of the corresponding X and Y selection lines is insufficient to render the tunnel rectifier conductive. The output tunnel rectifier is poled and connected so that it is conductive solely when coincident X and Y inputs causes the tunnel diode to be switched to its other voltage state. The word selection switch is therefore characterized in that it does not present any appreciable load to either one of its associated X and Y selection lines unless both of the associated X and Y selection lines are simultaneously energized.

These and other objects and aspects of the invention will be apparent to those skilled in the art from the following more detailed description taken in conjunction with the appended drawings, wherein.

Figure 1:
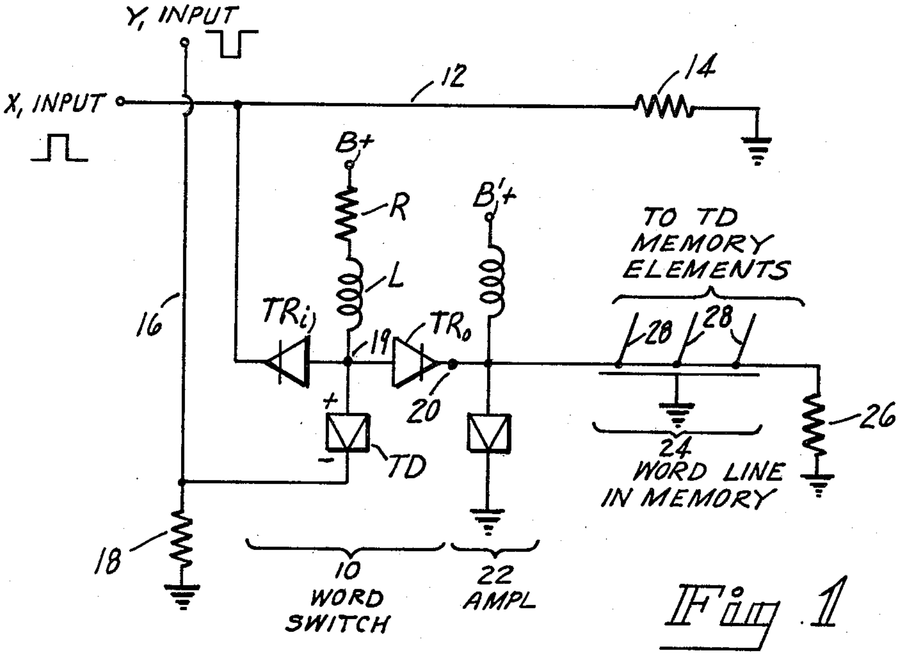
FIGURE 1 is a circuit diagram illustrating a word selection switch constructed according to the teachings of the invention and having inputs coupled to an associated X selection line and an associated Y selection line and having an output for driving a word line in a memory array.

The circuit of FIGURE 1 shows a portion of a memory system including a word selection switch 10. Inputs for the word switch 10 are provided by an X selection line 12 having an input terminal $X_1$ and having a terminating resistor 14 connected to ground; and a Y input line 16 having an input terminal $Y_1$ and having a terminating resistor 18 connected to ground. The word switch 10 includes a resistor R, an inductor L and a negative resistance diode such as a tunnel diode TD connected in series between a B+ terminal and the Y selection line 16. An input tunnel rectifier $TR_1$ is connected between the anode of the tunnel diode TD and the X selection line 12. An output tunnel rectifier $TR_0$ is connected between the anode of tunnel diode TD and an output terminal 20.

The output terminal 20 of the word switch 10 is connected through a monostable tunnel diode amplifier 22 to a word line 24 in a memory array. The remote end of the word line 24 is terminated as by means of resistor 26 connected to ground. Connections 28 are made from the word line 24 to tunnel diode memory elements in the memory array.

The values of the resistor R, the inductor L and the B+ voltage source are selected to provide a substantially constant current source to the tunnel diode anode 19. The B+ voltage is applied through a resistor R having a resistance which is large compared with the resistance of the tunnel diode circuit. This results in a bias current supplied to the tunnel diode circuit which remains substantially constant despite impedance changes in the tunnel diode circuit. The inductor L contributes to the maintenance of a constant current flow by resisting sudden current changes. The values may be selected to provide either bistable operation or monostable operation of the tunnel diode TD. If bistable operation is desired, the inductor L may be omitted and the resetting of the diode TD may be accomplished by the feedback of a signal through the tunnel rectifier $TR_o$ from the monostable amplifier 22. If monostable operation is desired, the inductor L is proportioned to provide the monostable mode of operation. Further description of bistable and monostable tunnel diode circuits may be found, for example, in the paper, "The Tunnel Diode as a Logic Element" by M. H. Lewin, A. G. Samusenko and A. W. Lo, appearing in the Digest of Technical Papers, 1960 International Solid States Circuits Conference, February 10, 1960.

FIGURE 1 shows one X selection line and one Y selection line, the word switch 10 associated with the selection lines shown, and the one word line 24 associated with word switch 10. It will be understood that a memory system includes a matrix of a large number of X and Y selection lines with an associated word selection switch at each crossover of one X selection line and one Y selection line.

Figures 2, 3:
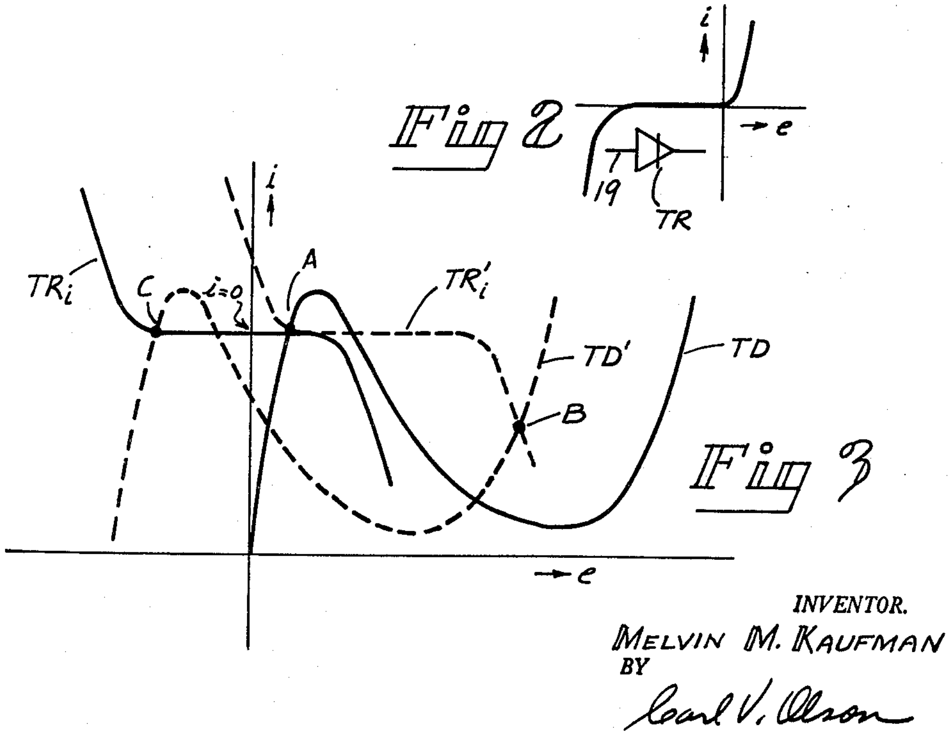
FIGURE 2 is a diagram which will be referred to in describing the characteristics of the tunnel rectifiers included in the circuit of FIGURE 1.
FIGURE 3 is a chart showing the current-voltage characteristics of the tunnel diode and input tunnel rectifier in the circuit of FIGURE 1 in relative relationships existing under different operating conditions of the circuit.

FIGURE 2 shows the current-voltage characteristics of the input tunnel rectifier $TR_i$ and the output tunnel rectifier $TR_o$ in FIGURE 1. The symbol employed to represent the tunnel rectifiers TR is one wherein a small positive potential applied to the terminal 19 is required to render the tunnel rectifier conductive in the direction of the arrowhead of the symbol, and a relatively much larger negative potential applied to the terminal 19 is required to render the diode conductive in the opposite direction.

The tunnel diode TD in the word switch 10 of FIGURE 1 is quiescently biased to operate at a point on the positive resistance, low voltage region of the characteristic curve. The input tunnel rectifier $TR_i$ is quiescently biased to operate in a high impedance or nonconducting region of its characteristic curve.

FIGURE 3 shows the quiescent operating point A at the intersection of the characteristic curve TD for the tunnel diode, and the characteristic curve $TR_i$ for the input tunnel rectifier. The characteristic curve $TR_i$ for the tunnel rectifier is shown inverted, compared with the representation of FIGURE 2, because the tunnel rectifier $TR_i$ is viewed as a load on the tunnel diode TD.

In the operation of the word switch 10 of FIGURE 1, the application of a positive input pulse from the X selection line 12 to the input tunnel rectifier $TR_i$ is represented in FIGURE 3 as causing a shift to the right, in the positive direction, of the characteristic $TR_i$ to the dotted line position designated $TR_i'$. It will be seen from FIGURE 3 that this shift of the tunnel rectifier characteristic curve does not change the operating condition of the tunnel diode TD because the tunnel rectifier $TR_i$ remains in its high impedance or nonconducting condition. The intersection of the curves TD and $TR_i'$ remains at the operating point A. It is therefore apparent that the application of input signal to the word switch from solely the X selection line 12 results in no change in the conductive states of the tunnel rectifier and the tunnel diode, and results in no current flow from the selection line 12 to the word switch.

When a negative input pulse simultaneously appears on the Y selection line 16 and is coupled to the cathode of the tunnel diode TD, there results a shift of the tunnel diode characteristic curve in FIGURE 3 in the negative or leftward direction to the position designated by the dotted curve TD'. The movement of the tunnel diode characteristic in the negative direction causes the operating point determined by the intersection of the two curves to switch from the operating point A to the only remaining intersection point B, wherein the input tunnel rectifier $TR_i$ is fully conductive and the tunnel diode TD is in its high voltage state.

When the tunnel diode TD is switched to its high voltage state, the output tunnel rectifier $TR_o$ is rendered conductive so that an output signal is supplied from the tunnel diode TD, through the output tunnel rectifier $TR_o$ to the output terminal 20, from which it is supplied through the amplifier 22 to the word line 24.

Consideration will now be given to the condition of the word switch 10 when the word switch receives an input solely from the Y selection line 16. In these circumstances, the input tunnel rectifier $TR_i$ receives no input and has a position in FIGURE 3 represented by the solid curve designated $TR_i$. The characteristic curve of the tunnel diode, however, being receptive to a negative input signal on its cathode, is moved to the negative direction to the position shown by the dotted curve TD'. Under these circumstances, the only stable intersection of the two curves is at the operating point C where the input tunnel rectifier $TR_i$ is still in its high impedance, nonconducting condition, and the tunnel diode TD is still in its low voltage operating state. It is therefore apparent that the application solely of an input to the word switch from the Y line is insufficient to cause any increased flow of current into the word switch because the input tunnel rectifier continues to present a very high impedance to current that tries to flow through the tunnel diode TD. The output tunnel rectifier $TR_o$ also plays a part in preventing the drawing of current when solely the Y selection line is energized. The tunnel rectifier $TR_o$ is poled and biased to present a very high impedance to the flow of current that would otherwise flow to the output terminal 20 due to the negative Y pulse applied to the cathode of the tunnel diode TD. Also, current is constrained from flowing in the path including the resistor R and inductor L because these elements have high impedance values selected in relation to the positive voltage connected to the B+ terminal to provide a substantially constant current to the junction point 19. It is therefore apparent that when only the X selection line input or only the Y selection line input is applied to the word switch 10, substantially no current is drawn by the word switch from the energized selection line.

It is only when both the X selection line and the Y selection line connected to the particular word switch are energized that a current is drawn by the word switch. This characteristic of the word switch 10 is of great practical importance because a large number of word switches are connected to each X selection line and each Y selection line. Even a small current drain by the half-selected word switches would add up to a large load or current drain on the selection voltage sources connected to the selection line input terminals $X_1$ and $Y_1$.

It is also apparent that the word selection switch 10 is characterized in that a selection input pulse from the X selection line 12 cannot be coupled through the word switch to the Y selection line 16, or vice versa. This isolation of the two X and Y selection lines provided by the word switch is of great practical importance in preventing the undesired coupling of disturbing signals throughout the memory.

What is claimed is:

1. A switch circuit comprising positive and negative signal input terminals, a direct current bias terminal, an impedance and a tunnel diode connected in series between the bias terminal and one of said input terminals, an input tunnel rectifier coupled between the other of said input terminals and the tunnel diode, said diode and rectifier being poled and biased so that the diode is normally in one of its voltage states and so that an input pulse on only one of the input terminals is insufficient to render said rectifier conductive and is thereby prevented from being coupled to the other input terminal, an output terminal, and an output tunnel rectifier coupled between said diode and said output terminal, said output tunnel rectifier being poled and biased to be conductive when a coincidence of positive and negative inputs causes the tunnel diode to be switched to its other voltage state, whereby the switching of the tunnel diode causes an output signal to be coupled through said output tunnel rectifier to said output terminal.

2. A switch circuit comprising X and Y input terminals receptive to signals of opposite polarities, a direct current bias terminal, an impedance and a tunnel diode connected in series between the bias terminal and said Y input terminal, an input tunnel rectifier coupled between said X input terminal and the tunnel diode, said diode and rectifier being poled and biased so that the diode is normally in one of its voltage states and so that an input pulse on only one of the X and Y input terminals is insufficient to render said rectifier conductive, an output terminal, and an output tunnel rectifier coupled between said diode and said output terminal, said output tunnel rectifier being poled and biased to be conductive when a coincidence of X and Y inputs causes the tunnel diode to be switched to its other voltage state.

3. A switch circuit comprising X and Y input terminals receptive to input pulses of opposite polarities, a direct current bias terminal, an inductor and a tunnel diode connected in series between the bias terminal and said Y input terminal, an input tunnel rectifier coupled between said X input terminal and the tunnel diode, said diode and rectifier being poled and biased so that the diode is normally in one of its voltage states and so that an input pulse on only one of the X and Y input terminals is insufficient to render said rectifier conductive and is thereby prevented from being coupled to the other input terminal, an output terminal, and an output tunnel rectifier coupled between said diode and said output terminal, said output tunnel rectifier being poled and biased to be conductive solely when a coincidence of X and Y inputs causes the tunnel diode to be switched to its other voltage state, whereby the switching of the tunnel diode causes an output signal to be coupled through said output tunnel rectifier to said output terminal.

4. A switch circuit comprising X and Y input terminals, a direct current bias terminal, an inductor and a tunnel diode connected in series between the bias terminal and said Y input terminal, an input tunnel rectifier coupled between said X input terminal and the tunnel diode, said diode and rectifier being poled and biased so that the diode is normally in one of its voltage states and so that an input pulse on only one of the X and Y input terminals is insufficient to render said rectifier conductive and is thereby prevented from being coupled to the other input terminal, a tunnel diode amplifier, and an output tunnel rectifier coupled between said tunnel diode and said amplifier, said output tunnel rectifier being poled and biased to be conductive when a coincidence of X and Y inputs causes the tunnel diode to be switched to its other voltage state, whereby the switching of the tunnel diode causes an output signal to be coupled through said output tunnel rectifier to said amplifier.

5. In a word organized memory system having a word line for each word storage position in the memory, and having a matrix of X selection lines and Y selection lines with each crossover of one X selection line and one Y selection line corresponding with one of the word lines in the memory, the X and Y selection lines being supplied with input pulses of opposite polarities, a word switch circuit coupling the X and Y lines at each crossover to the corresponding word line, each word switch circuit comprising a direct current bias terminal, an impedance and a tunnel diode connected in series between the bias terminal and associated Y line, an input tunnel rectifier coupled from said X line to the tunnel diode, is normally in one of its voltage states and so that an input pulse on only one of the corresponding X and Y selection lines is insufficient to render said rectifier conductive, and an output tunnel rectifier coupled from said diode to said word line, said output tunnel rectifier being poled and biased to be conductive when a coincidence of X and Y inputs causes the tunnel diode to be switched to its other voltage state.

6. In a word organized memory system having a word line for each word storage position in the memory, and having a matrix of X selection lines and Y selection lines with each crossover of one X selection line and one Y selection line corresponding with one of the word lines in the memory, a word switch circuit coupling the X and Y lines at each crossover to the corresponding word line, each word switch circuit comprising a direct current bias terminal, an impedance and a tunnel diode connected in series between the bias terminal and associated Y line, an input tunnel rectifier coupled from said X line to the tunnel diode, said diode and rectifier being poled and biased so that the diode is normally in one of its voltage states and so that an input pulse on only one of the corresponding X and Y selection lines is insufficient to render said rectifier conductive and is thereby prevented from being coupled to the other selection line, and an output tunnel rectifier coupled from said diode to said word line, said output tunnel rectifier being poled and biased to be conductive when a coincidence of X and Y inputs causes the tunnel diode to be switched to its other voltage state, whereby the switching of the tunnel diode causes an energizing signal to be coupled through said output tunnel rectifier to said word line.

7. In a word organized memory system having a word line for each word storage position in the memory, and having a matrix of X selection lines and Y selection lines with each crossover of one X selection line and one Y selection line corresponding with one of the word lines in the memory, said X and Y selection lines being supplied with input pulses of opposite polarities, a word switch circuit coupling the X and Y lines at each crossover to the corresponding word line, each word switch circuit comprising a direct current bias terminal, an inductor and a tunnel diode connected in series between the bias terminal and associated Y line, an input tunnel rectifier coupled from said X line to the tunnel diode, said diode and rectifier being poled and biased so that the diode is normally in one of its voltage states and so that an input pulse on only one of the corresponding X and Y selection lines is insufficient to render said rectifier conductive and is thereby prevented from being coupled to the other selection line, and an output tunnel rectifier and a monostable amplifier coupled from said diode to said word line, said output tunnel rectifier being poled and biased to be conductive solely when a coincidence of X and Y inputs causes the tunnel diode to be switched to its other voltage state, whereby the switching of the tunnel diode causes an energizing signal to be coupled through said output tunnel rectifier and said amplifier to said word line.

8. A word organized memory system comprising a word line for each word storage position in the memory, a matrix of X selection lines and Y selection lines with each crossover of one X selection line and one Y selection line corresponding with one of the word lines in the memory, means to apply opposite polarity input pulses to said X and Y selection lines, a word switch circuit coupling the X and Y lines at each crossover to the corresponding word line, each word switch circuit including a direct current bias terminal, an impedance and a tunnel diode connected in series between the bias terminal and associated Y line, an input tunnel rectifier coupled from said X line to the tunnel diode, said diode and rectifier being poled and biased so that the diode is normally in one of its voltage states and so that an input pulse on only one of the corresponding X and Y selection lines is insufficient to render said rectifier conductive and is thereby prevented from being coupled to the other selection line, and an output tunnel rectifier coupled from said diode to said word line, said output tunnel rectifier being poled and biased to be conductive solely when a coincidence of X and Y inputs causes the tunnel diode to be switched to its other voltage state, whereby the switching of the tunnel diode causes an energizing signal to be coupled through said output tunnel rectifier to said word line.

9. A switch circuit comprising positive and negative signal input terminals, a direct current bias terminal, an impedance and a negative resistance diode connected in series between the bias terminal and one of said input terminals, and an input rectifier coupled between the other of said input terminals and the diode, said diode and rectifier being poled and biased so that the diode is normally in one of its voltage states and the rectifier is normally non-conductive and so that an input pulse on only one of the input terminals is insufficient to render said rectifier conductive and is thereby prevented from being coupled to the other input terminal.

10. A switch circuit comprising X and Y input terminals receptive to signals of opposite polarities, a direct current bias terminal, an impedance and a negative resistance diode connected in series between the bias terminal and said Y input terminal, an input rectifier coupled between said X input terminal and the diode, said diode and rectifier being poled and biased so that the diode is normally in one of its voltage states and so that an input pulse on only one of the X and Y input terminals is insufficient to render said rectifier conductive, an output terminal, and an output rectifier coupled between said diode and said output terminal, said output rectifier being poled and biased to be conductive when a coincidence of X and Y inputs causes the diode to be switched to its other voltage state.

References Cited in the file of this patent

UNITED STATES PATENTS

| | | |
|---|---|---|
| 3,011,155 | Dunlap | Nov. 28, 1961 |
| 3,017,613 | Miller | Jan. 16, 1962 |